(12) United States Patent
Hikosaka

(10) Patent No.: US 11,146,761 B2
(45) Date of Patent: Oct. 12, 2021

(54) IMAGING APPARATUS, IMAGE PROCESSING DEVICE, AND IMAGE PROCESSING METHOD

(71) Applicant: CANON KABUSHIKI KAISHA, Tokyo (JP)

(72) Inventor: Shingo Hikosaka, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/674,329

(22) Filed: Nov. 5, 2019

(65) Prior Publication Data

US 2020/0162706 A1    May 21, 2020

(30) Foreign Application Priority Data

Nov. 19, 2018    (JP) .............................. JP2018-216203

(51) Int. Cl.
  *H04N 9/04*   (2006.01)
  *H04N 9/64*   (2006.01)
  *B60Q 9/00*   (2006.01)
  *B60R 11/04*   (2006.01)

(52) U.S. Cl.
  CPC ......... *H04N 9/04515* (2018.08); *H04N 9/646* (2013.01); *B60Q 9/008* (2013.01); *B60R 11/04* (2013.01)

(58) Field of Classification Search
  CPC ..... H04N 9/04515; H04N 9/646; B60R 11/04
  See application file for complete search history.

(56) References Cited

U.S. PATENT DOCUMENTS

| | | | |
|---|---|---|---|
| 7,796,814 B2 | 9/2010 | Sato | |
| 8,243,160 B2* | 8/2012 | Azuma | H04N 5/2355 348/222.1 |
| 8,310,576 B2* | 11/2012 | Hashimoto | H04N 5/378 348/300 |
| 10,368,041 B2* | 7/2019 | Iwakura | H04N 5/374 |
| 10,567,712 B2 | 2/2020 | Hikosaka | |
| 10,965,890 B2* | 3/2021 | Shigeta | H04N 5/343 |
| 10,979,647 B2* | 4/2021 | Takado | H01L 27/14643 |
| 2008/0124000 A1 | 5/2008 | Sato | |
| 2019/0149780 A1 | 5/2019 | Hikosaka | |
| 2019/0182465 A1* | 6/2019 | Kawano | G06T 5/001 |

FOREIGN PATENT DOCUMENTS

JP    2007-288395    11/2007

* cited by examiner

*Primary Examiner* — Tsion B Owens
(74) *Attorney, Agent, or Firm* — Venable LLP

(57) ABSTRACT

An imaging apparatus includes: a first interpolation unit that generates luminance interpolation values at a plurality of second pixels based on luminance values at a plurality of first pixels; a select unit that selects the plurality of second pixels at each of which an absolute value of a difference between each of the luminance interpolation values at the plurality of second pixels generated by the first interpolation unit and the luminance value at the plurality of first pixels of the first pixels is less than or equal to a predetermined value; and a second interpolation unit that generates a color interpolation value corresponding to one color component at the predetermined first pixel based on color values at the plurality of second pixels selected by the select unit.

17 Claims, 25 Drawing Sheets

FIG. 4A

| R | W | G | W |
|---|---|---|---|
| W | W | W | W |
| G | W | B | W |
| W | W | W | W |

FIG. 4B

| R | W | B | W |
|---|---|---|---|
| W | G | W | G |
| R | W | B | W |
| W | G | W | G |

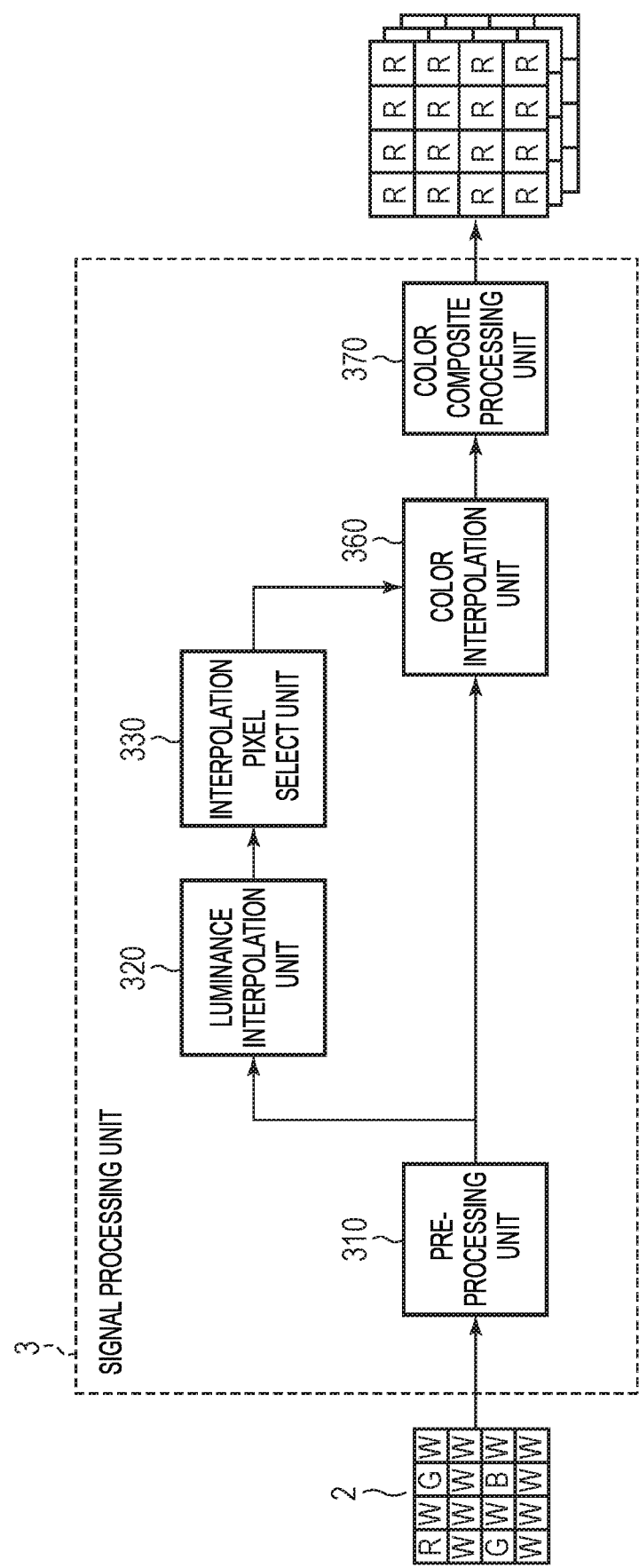

FIG. 6

|   | 1 | 2 | 3 | 4 |
|---|---|---|---|---|
| 1 | ? | W | ? | W |
| 2 | W | W | W | W |
| 3 | ? | W | ? | W |
| 4 | W | W | W | W |

FIG. 7A

|   | 1 | 2 | 3 | 4 | 5 | 6 | 7 | 8 | 9 |
|---|---|---|---|---|---|---|---|---|---|
| 1 | R | W | G | W | R | W | G | W | R |
| 2 | W | W | W | W | W | W | W | W | W |
| 3 | G | W | B | W | G | W | B | W | G |
| 4 | W | W | W | W | W | W | W | W | W |
| 5 | R | W | G | W | R | W | G | W | R |
| 6 | W | W | W | W | W | W | W | W | W |
| 7 | G | W | B | W | G | W | B | W | G |
| 8 | W | W | W | W | W | W | W | W | W |
| 9 | R | W | G | W | R | W | G | W | R | im(i,j)

FIG. 7B

|   | 1 | 2 | 3 | 4 | 5 | 6 | 7 | 8 | 9 |
|---|---|---|---|---|---|---|---|---|---|
| 1 | iWr | W | iWg | W | iWr | W | iWg | W | iWr |
| 2 | W | W | W | W | W | W | W | W | W |
| 3 | iWg | W | iWb | W | iWg | W | iWb | W | iWg |
| 4 | W | W | W | W | W | W | W | W | W |
| 5 | iWr | W | iWg | W | iWr | W | iWg | W | iWr |
| 6 | W | W | W | W | W | W | W | W | W |
| 7 | iWg | W | iWb | W | iWg | W | iWb | W | iWg |
| 8 | W | W | W | W | W | W | W | W | W |
| 9 | iWr | W | iWg | W | iWr | W | iWg | W | iWr |

A

B imW(i,j)

FIG. 7C

|   | 1 | 2 | 3 | 4 | 5 | 6 | 7 | 8 | 9 |
|---|---|---|---|---|---|---|---|---|---|
| 1 | 0 |   | 0 |   | 0 |   | 0 |   | 0 |
| 2 |   |   |   |   |   |   |   |   |   |
| 3 | 0 |   | 1 |   | 1 |   | 1 |   | 1 |
| 4 |   |   |   |   |   |   |   |   |   |
| 5 | 0 |   | 1 |   | 1 |   | 1 |   | 1 |
| 6 |   |   |   |   | W |   |   |   |   |
| 7 | 0 |   | 1 |   | 1 |   | 1 |   | 1 |
| 8 |   |   |   |   |   |   |   |   |   |
| 9 | 0 |   | 1 |   | 1 |   | 1 |   | 1 |

|   | 1 | 2 | 3 | 4 | 5 | 6 | 7 | 8 | 9 |
|---|---|---|---|---|---|---|---|---|---|
| 1 | R | W | G | W | R | W | G | W | R |
| 2 | W | W | W | W | W | W | W | W | W |
| 3 | G | W | B | W | G | W | B | W | G |
| 4 | W | W | W | W | W | W | W | W | W |
| 5 | R | W | G | W | R | W | G | W | R |
| 6 | W | W | W | W | W | W | W | W | W |
| 7 | G | W | B | W | G | W | B | W | G |
| 8 | W | W | W | W | W | W | W | W | W |
| 9 | R | W | G | W | R | W | G | W | R | im(i,j)

FIG. 8B

|   | 1 | 2 | 3 | 4 | 5 | 6 | 7 | 8 | 9 |
|---|---|---|---|---|---|---|---|---|---|
| 1 | R | W | G | W | R | W | G | W | R |
| 2 | W | W | W | W | W | W | W | W | W |
| 3 | G | W | B | W | G | W | B | W | G |
| 4 | W | W | W | W | W | W | W | W | W |
| 5 | R | W | G | W | R | W | G | W | R |
| 6 | W | W | W | W | W | W | W | W | W |
| 7 | G | W | B | W | G | W | B | W | G |
| 8 | W | W | W | W | W | W | W | W | W |
| 9 | R | W | G | W | R | W | G | W | R | im(i,j)

FIG. 8C

|   | 1 | 2 | 3 | 4 | 5 | 6 | 7 | 8 | 9 |
|---|---|---|---|---|---|---|---|---|---|
| 1 | R | W | G | W | R | W | G | W | R |
| 2 | W | W | W | W | W | W | W | W | W |
| 3 | G | W | B | W | G | W | B | W | G |
| 4 | W | W | W | W | W | W | W | W | W |
| 5 | R | W | G | W | R | W | G | W | R |
| 6 | W | W | W | W | W | W | W | W | W |
| 7 | G | W | B | W | G | W | B | W | G |
| 8 | W | W | W | W | W | W | W | W | W |
| 9 | R | W | G | W | R | W | G | W | R | im(i,j)

FIG. 8D

|   | 1 | 2 | 3 | 4 | 5 | 6 | 7 | 8 | 9 |
|---|---|---|---|---|---|---|---|---|---|
| 1 | iWr | W | iWg | W | iWr | W | iWg | W | iWr |
| 2 | W | W | W | W | W | W | W | W | W |
| 3 | iWg | W | iWb | W | iWg | W | iWb | W | iWg |
| 4 | W | W | W | W | W | W | W | W | W |
| 5 | iWr | W | iWg | W | iWr | W | iWg | W | iWr |
| 6 | W | W | W | W | W | W | W | W | W |
| 7 | iWg | W | iWb | W | iWg | W | iWb | W | iWg |
| 8 | W | W | W | W | W | W | W | W | W |
| 9 | iWr | W | iWg | W | iWr | W | iWg | W | iWr | imW (i,j)

FIG. 8E

|   | 1 | 2 | 3 | 4 | 5 | 6 | 7 | 8 | 9 |
|---|---|---|---|---|---|---|---|---|---|
| 1 | iWr | W | iWg | W | iWr | W | iWg | W | iWr |
| 2 | W | W | W | W | W | W | W | W | W |
| 3 | iWg | W | iWb | W | iWg | W | iWb | W | iWg |
| 4 | W | W | W | W | W | W | W | W | W |
| 5 | iWr | W | iWg | W | iWr | W | iWg | W | iWr |
| 6 | W | W | W | W | W | W | W | W | W |
| 7 | iWg | W | iWb | W | iWg | W | iWb | W | iWg |
| 8 | W | W | W | W | W | W | W | W | W |
| 9 | iWr | W | iWg | W | iWr | W | iWg | W | iWr | imW (i,j)

FIG. 8F

|   | 1 | 2 | 3 | 4 | 5 | 6 | 7 | 8 | 9 |
|---|---|---|---|---|---|---|---|---|---|
| 1 | iWr | W | iWg | W | iWr | W | iWg | W | iWr |
| 2 | W | W | W | W | W | W | W | W | W |
| 3 | iWg | W | iWb | W | iWg | W | iWb | W | iWg |
| 4 | W | W | W | W | W | W | W | W | W |
| 5 | iWr | W | iWg | W | iWr | W | iWg | W | iWr |
| 6 | W | W | W | W | W | W | W | W | W |
| 7 | iWg | W | iWb | W | iWg | W | iWb | W | iWg |
| 8 | W | W | W | W | W | W | W | W | W |
| 9 | iWr | W | iWg | W | iWr | W | iWg | W | iWr | imW (i,j)

FIG. 10A

|   | 1 | 2 | 3 | 4 | 5 | 6 | 7 | 8 | 9 |
|---|---|---|---|---|---|---|---|---|---|
| 1 | R | W | G | W | R | W | G | W | R |
| 2 | W | W | W | W | W | W | W | W | W |
| 3 | G | W | B | W | G | W | B | W | G |
| 4 | W | W | W | W | W | W | W | W | W |
| 5 | R | W | G | W | R | W | G | W | R |
| 6 | W | W | W | W | W | W | W | W | W |
| 7 | G | W | B | W | G | W | B | W | G |
| 8 | W | W | W | W | W | W | W | W | W |
| 9 | R | W | G | W | R | W | G | W | R |

|   | 1 | 2 | 3 | 4 | 5 | 6 | 7 | 8 | 9 |
|---|---|---|---|---|---|---|---|---|---|
| 1 | R | W | G | W | R | W | G | W | R |
| 2 | W | W | W | W | W | W | W | W | W |
| 3 | G | W | B | W | G | W | B | W | G |
| 4 | W | W | W | W | W | W | W | W | W |
| 5 | R | W | G | W | R | W | G | W | R |
| 6 | W | W | W | W | W | W | W | W | W |
| 7 | G | W | B | W | G | W | B | W | G |
| 8 | W | W | W | W | W | W | W | W | W |
| 9 | R | W | G | W | R | W | G | W | R | im(i,j)

FIG. 11B

|   | 1 | 2 | 3 | 4 | 5 | 6 | 7 | 8 | 9 |
|---|---|---|---|---|---|---|---|---|---|
| 1 | R | W | G | W | R | W | G | W | R |
| 2 | W | W | W | W | W | W | W | W | W |
| 3 | G | W | B | W | G | W | B | W | G |
| 4 | W | W | W | W | W | W | W | W | W |
| 5 | R | W | G | W | R | W | G | W | R |
| 6 | W | W | W | W | W | W | W | W | W |
| 7 | G | W | B | W | G | W | B | W | G |
| 8 | W | W | W | W | W | W | W | W | W |
| 9 | R | W | G | W | R | W | G | W | R | im(i,j)

FIG. 11C

|   | 1 | 2 | 3 | 4 | 5 | 6 | 7 | 8 | 9 |
|---|---|---|---|---|---|---|---|---|---|
| 1 | R | W | G | W | R | W | G | W | R |
| 2 | W | W | W | W | W | W | W | W | W |
| 3 | G | W | B | W | G | W | B | W | G |
| 4 | W | W | W | W | W | W | W | W | W |
| 5 | R | W | G | W | R | W | G | W | R |
| 6 | W | W | W | W | W | W | W | W | W |
| 7 | G | W | B | W | G | W | B | W | G |
| 8 | W | W | W | W | W | W | W | W | W |
| 9 | R | W | G | W | R | W | G | W | R | im(i,j)

FIG. 11D

|   | 1 | 2 | 3 | 4 | 5 | 6 | 7 | 8 | 9 |
|---|---|---|---|---|---|---|---|---|---|
| 1 | iWr | W | iWg | W | iWr | W | iWg | W | iWr |
| 2 | W | W | W | W | W | W | W | W | W |
| 3 | iWg | W | iWb | W | iWg | W | iWb | W | iWg |
| 4 | W | W | W | W | W | W | W | W | W |
| 5 | iWr | W | iWg | W | iWr | W | iWg | W | iWr |
| 6 | W | W | W | W | W | W | W | W | W |
| 7 | iWg | W | iWb | W | iWg | W | iWb | W | iWg |
| 8 | W | W | W | W | W | W | W | W | W |
| 9 | iWr | W | iWg | W | iWr | W | iWg | W | iWr | imW (i,j)

FIG. 11E

|   | 1 | 2 | 3 | 4 | 5 | 6 | 7 | 8 | 9 |
|---|---|---|---|---|---|---|---|---|---|
| 1 | iWr | W | iWg | W | iWr | W | iWg | W | iWr |
| 2 | W | W | W | W | W | W | W | W | W |
| 3 | iWg | W | iWb | W | iWg | W | iWb | W | iWg |
| 4 | W | W | W | W | W | W | W | W | W |
| 5 | iWr | W | iWg | W | iWr | W | iWg | W | iWr |
| 6 | W | W | W | W | W | W | W | W | W |
| 7 | iWg | W | iWb | W | iWg | W | iWb | W | iWg |
| 8 | W | W | W | W | W | W | W | W | W |
| 9 | iWr | W | iWg | W | iWr | W | iWg | W | iWr | imW (i,j)

FIG. 11F

|   | 1 | 2 | 3 | 4 | 5 | 6 | 7 | 8 | 9 |
|---|---|---|---|---|---|---|---|---|---|
| 1 | iWr | W | iWg | W | iWr | W | iWg | W | iWr |
| 2 | W | W | W | W | W | W | W | W | W |
| 3 | iWg | W | iWb | W | iWg | W | iWb | W | iWg |
| 4 | W | W | W | W | W | W | W | W | W |
| 5 | iWr | W | iWg | W | iWr | W | iWg | W | iWr |
| 6 | W | W | W | W | W | W | W | W | W |
| 7 | iWg | W | iWb | W | iWg | W | iWb | W | iWg |
| 8 | W | W | W | W | W | W | W | W | W |
| 9 | iWr | W | iWg | W | iWr | W | iWg | W | iWr | imW (i,j)

IMAGING APPARATUS, IMAGE PROCESSING DEVICE, AND IMAGE PROCESSING METHOD

BACKGROUND OF THE INVENTION

Field of the Invention

The present invention relates to an imaging apparatus, an image processing device, and an image processing method.

Description of the Related Art

In an imaging apparatus such as a complementary metal oxide semiconductor (CMOS) image sensor, a charge coupled device (CCD) image sensor, or the like, color filters of red (R), green (G), blue (B), or the like are formed in accordance with the Bayer arrangement, for example, on a plurality of two-dimensionally arranged photoelectric conversion elements. In recent years, pixel arrangement including W pixels each having a filter that transmits all the wavelengths of visible light in addition to color pixels of RGB or the like has been proposed. The number of color pixels in a pixel arrangement having W pixels is less than the number of color pixels in the Bayer arrangement. Thus, a false color is likely to occur in the pixel arrangement having W pixels. To address such a problem, a technique disclosed in Japanese Patent Application Laid-Open No. 2007-288395 detects a plane with close luminance and performs color interpolation on each detected plane by referencing information on W pixels.

In Japanese Patent Application Laid-Open No. 2007-288395, however, since interpolation is performed on a plane basis, there is a problem of occurrence of a false color on the edge of a subject, for example.

SUMMARY OF THE INVENTION

An imaging apparatus according to one disclosure of the present specification includes: a pixel unit having a plurality of first pixels and a plurality of second pixels, in which the plurality of first pixels have higher sensitivity than the plurality of second pixels and output luminance values, and the plurality of second pixels output color values including one color component of a plurality of colors; a first interpolation unit that generates luminance interpolation values at the plurality of second pixels based on the luminance values at the plurality of first pixels; a select unit that selects plurality of second pixels at each of which an absolute value of a difference between each of the luminance interpolation values at the plurality of second pixels generated by the first interpolation unit and the luminance value at a predetermined first pixel of the first pixels is less than or equal to a predetermined value; and a second interpolation unit that generates a color interpolation value at the predetermined first pixel based on the color values at the plurality of second pixels selected by the select unit.

An image processing device according to another disclosure of the present specification is an image processing device that processes a signal from a solid state imaging device comprising a pixel unit having a plurality of first pixels and a plurality of second pixels, in which the plurality of first pixels have higher sensitivity than the plurality of second pixel and include luminance values, and the plurality of second pixels output color values including one color component of a plurality of colors, and the image processing device includes: a first interpolation unit that generates luminance interpolation values at the plurality of second pixels based on the luminance values at the plurality of first pixels; a select unit that selects the plurality of second pixels at each of which an absolute value of a difference between each of the luminance interpolation values at the plurality of second pixels generated by the first interpolation unit and the luminance value at a predetermined first pixel of the first pixels is less than or equal to a predetermined value; and a second interpolation unit that generates a color interpolation value at the predetermined first pixel based on the color values at the plurality of second pixels selected by the select unit.

An image processing method according to yet another disclosure of the present specification is a method for a pixel unit having a plurality of first pixels and a plurality of second pixels, the plurality of first pixels having higher sensitivity than the plurality of second pixel and outputting luminance values, and the plurality of second pixels outputting color values including one color component of a plurality of colors, the method comprising: generating luminance interpolation values at the plurality of second pixels based on the luminance values at the plurality of first pixels; selecting the plurality of second pixels at each of which an absolute value of a difference between each of the luminance interpolation values at the plurality of second pixels and the luminance value at a predetermined first pixel of the first pixels is less than or equal to a predetermined value; and generating a color interpolation value corresponding to the one color component at the predetermined first pixel based on the color values at the selected plurality of second pixels.

Further features of the present invention will become apparent from the following description of exemplary embodiments with reference to the attached drawings.

BRIEF DESCRIPTION OF THE DRAWINGS

FIG. 4A and FIG. 4B are schematic diagrams of color filters of the pixel unit in the first embodiment.

FIG. 5 is a block diagram of a signal processing unit in the first embodiment.

FIG. 6 is a diagram illustrating an interpolation process in the first embodiment.

FIG. 7A is a diagram illustrating a pixel block of a calculation region in the first embodiment.

FIG. 7B is a diagram illustrating a pixel block after luminance interpolation in the first embodiment.

FIG. 7C is a diagram of one example of address information in the first embodiment.

FIG. 8A is a diagram illustrating an interpolation process of an R value in the first embodiment.

FIG. 8B is a diagram illustrating an interpolation process of a G value in the first embodiment.

FIG. 8C is a diagram illustrating an interpolation process of a B value in the first embodiment.

FIG. 8D is a diagram illustrating an interpolation process of an iWr value in the first embodiment.

FIG. 8E is a diagram illustrating an interpolation process of an iWg value in the first embodiment.

FIG. 8F is a diagram illustrating an interpolation process of an iWb value in the first embodiment.

FIG. 10A is a diagram illustrating a pixel block of a calculation region in the second embodiment.

FIG. 10B is a diagram of one example of address information in the second embodiment.

FIG. 11A is a diagram illustrating an interpolation process of an R value in the second embodiment.

FIG. 11B is a diagram illustrating an interpolation process of a G value in the second embodiment.

FIG. 11C is a diagram illustrating an interpolation process of a B value in the second embodiment.

FIG. 11D is a diagram illustrating an interpolation process of an iWr value in the second embodiment.

FIG. 11E is a diagram illustrating an interpolation process of an iWg value in the second embodiment.

FIG. 11F is a diagram illustrating an interpolation process of an iWb value in the second embodiment.

DESCRIPTION OF THE EMBODIMENTS

Imaging apparatuses of respective embodiments will be described below with reference to the drawings.

First Embodiment

Figure 1:
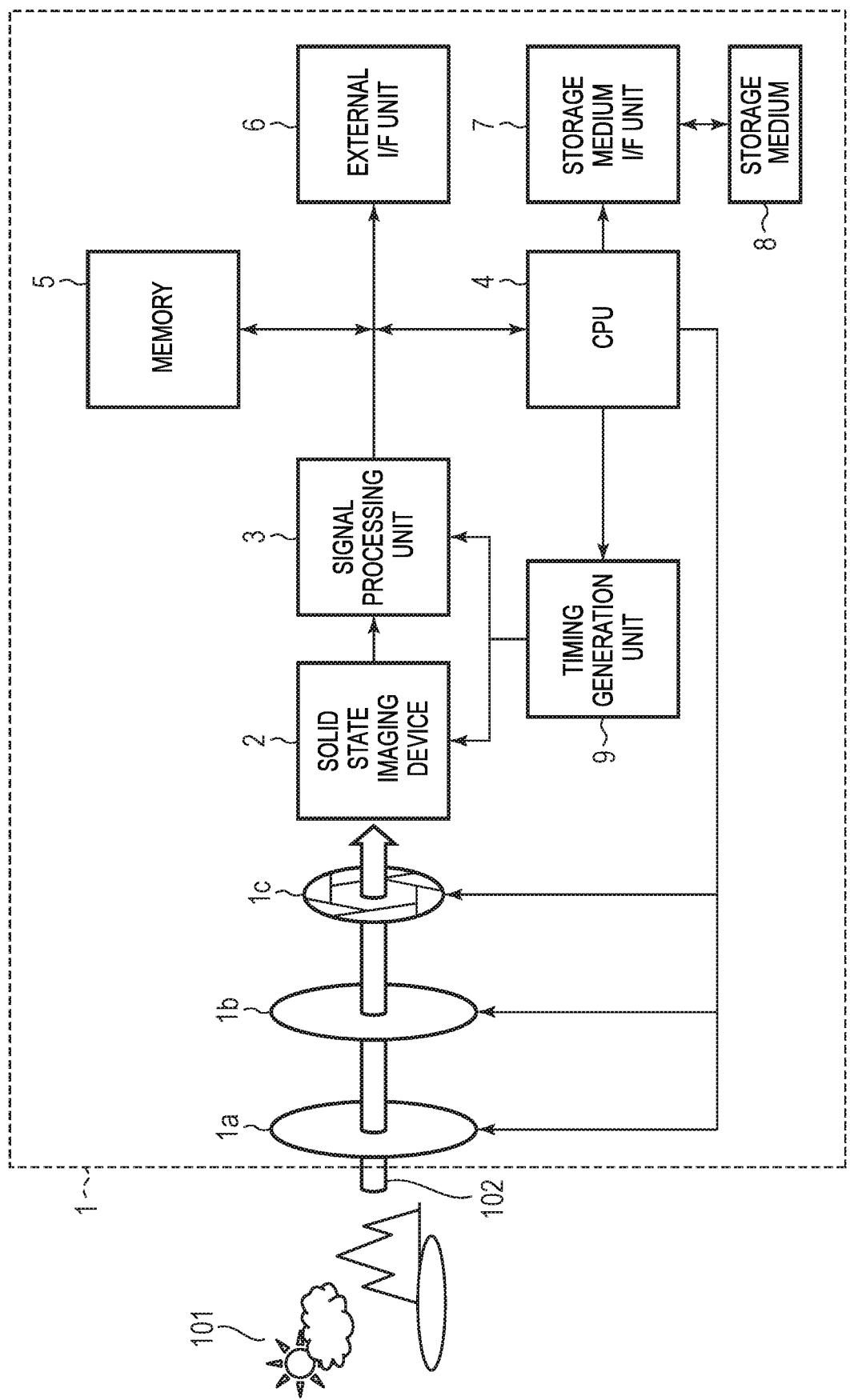
FIG. 1 is a block diagram of an imaging apparatus in a first embodiment.

FIG. 1 is a block diagram of an imaging apparatus according to the present embodiment. The imaging apparatus is an apparatus that acquires a static image, a moving image, or the like and may be, for example, a digital still camera, a digital camcorder, a surveillance camera, a smartphone, an on-vehicle camera, or the like. An imaging apparatus 1 has a barrier 1a, a lens 1b, an aperture 1c, a solid state imaging device 2, a signal processing unit 3, a central processing unit (CPU) 4, a memory 5, an external interface (I/F) unit 6, a storage medium I/F unit 7, a storage medium 8, and a timing generation unit 9.

The solid state imaging device 2 is a CCD image sensor, a CMOS image sensor, or the like, which converts an optical image 102 emitted from a subject 101 into an electric signal and outputs the electric signal to the post-stage signal processing unit 3. The lens 1b captures the optical image 102 of the subject 101 onto the solid state imaging device 2. The aperture 1c adjusts a light amount of the optical image 102 captured on the solid state imaging device 2 via the lens 1b. The barrier 1a that protects the lens 1b is arranged if necessary.

The signal processing unit 3 has a digital signal processing circuit and performs various correction or compression on a signal output from the solid state imaging device 2 to output image data. When the signal output from the solid state imaging device 2 is an analog signal, the signal processing unit 3 may have an analog-to-digital conversion (A/D conversion) circuit on a pre-stage of a digital signal processing unit. Note that the signal processing unit 3 may be provided in the solid state imaging device 2 or may be provided in a computer outside the imaging apparatus 1.

The CPU 4 controls the overall operation of the imaging apparatus 1 in accordance with a pre-defined control program. The control program may be written in the memory 5 in advance or may be supplied from the outside of the imaging apparatus 1. The memory 5 may include a frame memory used for temporarily storing image data, a nonvolatile memory used for storing the control program described above, or the like. The external I/F unit 6 is a circuit used for communicating with an external computer, an image processing device, a network, or the like. The storage medium I/F unit 7 is an interface used for performing storage or readout on the storage medium 8. The storage medium 8 is a semiconductor memory, a magneto-optical storage medium, or the like and may be removable from or embedded in the imaging apparatus 1. The timing generation unit 9 outputs timing signals such as a clock signal, a synchronization signal, or the like to the solid state imaging device 2 and the signal processing unit 3. Note that the timing signal may be supplied from the outside of the imaging apparatus 1.

Figure 2:
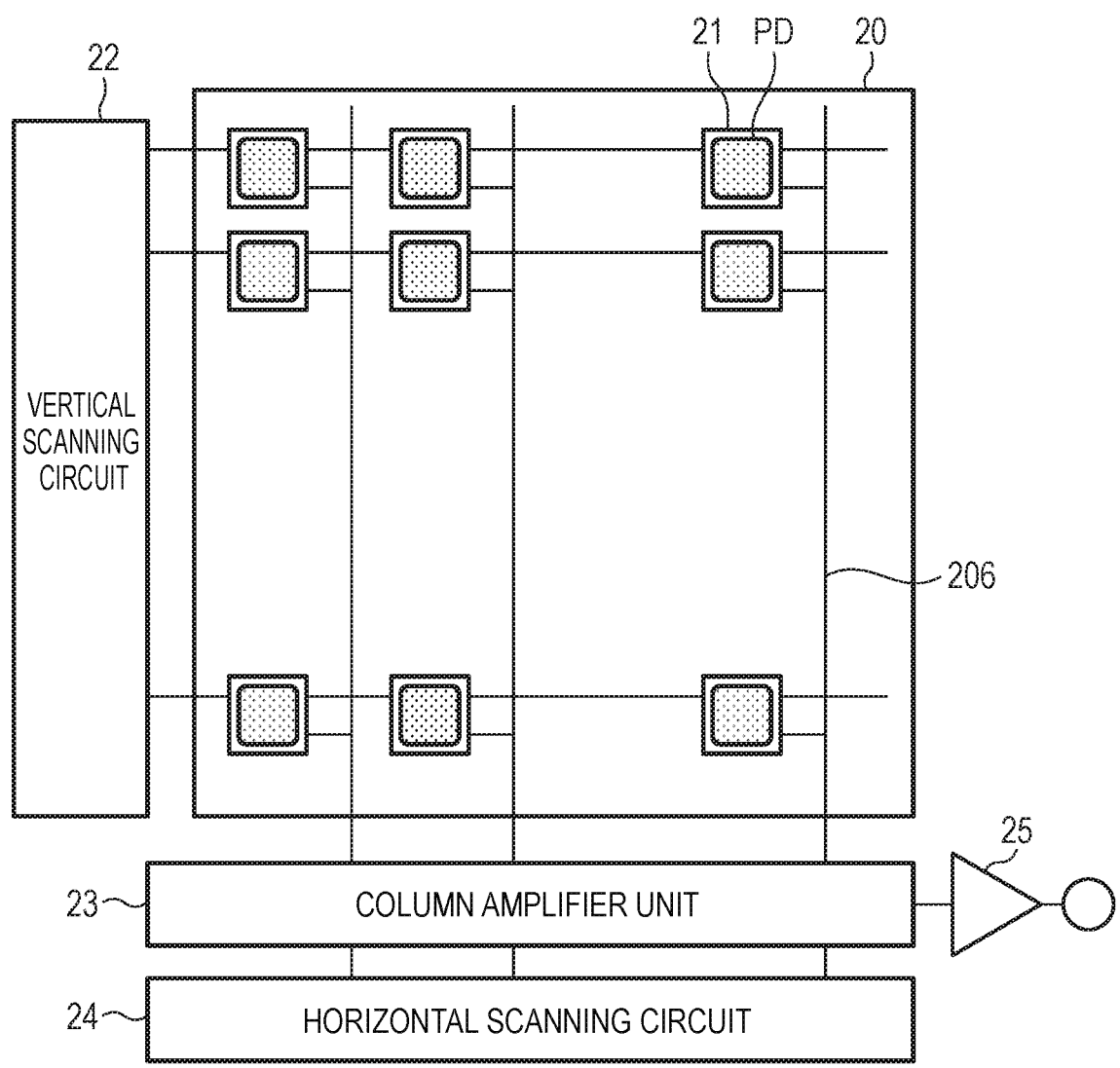
FIG. 2 is a block diagram of a solid state imaging device in the first embodiment.

FIG. 2 is a block diagram of the solid state imaging device 2 in the present embodiment. The solid state imaging device 2 has a pixel unit 20 in which a plurality of pixels 21 are arranged in a matrix, a vertical scanning circuit 22, a column amplifier unit 23, a horizontal scanning circuit 24, and an output unit 25. The pixel unit 20 has the plurality of pixels 21 arranged in a matrix, and each of the pixels 21 has a photoelectric conversion element PD. A color filter used for producing a color image is provided on each pixel 21. Color filters are arranged on a side where a light from a subject enters the photoelectric conversion elements PD, pixel signals representing color intensities are output from the pixels 21, and a color image is produced based on the pixel signals. The photoelectric conversion element PD generates charges in accordance with the emitted light, and the pixel 21 outputs a voltage based on charges. The vertical scanning circuit 22 supplies a control signal used for controlling the transistors of the pixels 21 to be in a conductive state (turned on) or a non-conductive state (turned off). The pixel unit 20 has vertical signal lines 206 for reading out pixel signals from the pixels 21. Pixel signals transferred from the pixels 21 to the vertical signal lines 206 are read out on a pixel column basis. The horizontal scanning circuit 24 supplies a control signal used for controlling each switch connected to an amplifier of each pixel column to be turned on or off. The output unit 25 is formed of a buffer amplifier, a differential amplifier, or the like and outputs a pixel signal from a column amplifier unit 23 to the signal processing unit 3 outside the solid state imaging device 2. A process such as analog-to-digital conversion, correction of input data, or the like is performed on the output pixel signal by the signal processing unit 3. Note that the solid state imaging device 2 may have a function of analog-to-digital conversion.

Figure 3:
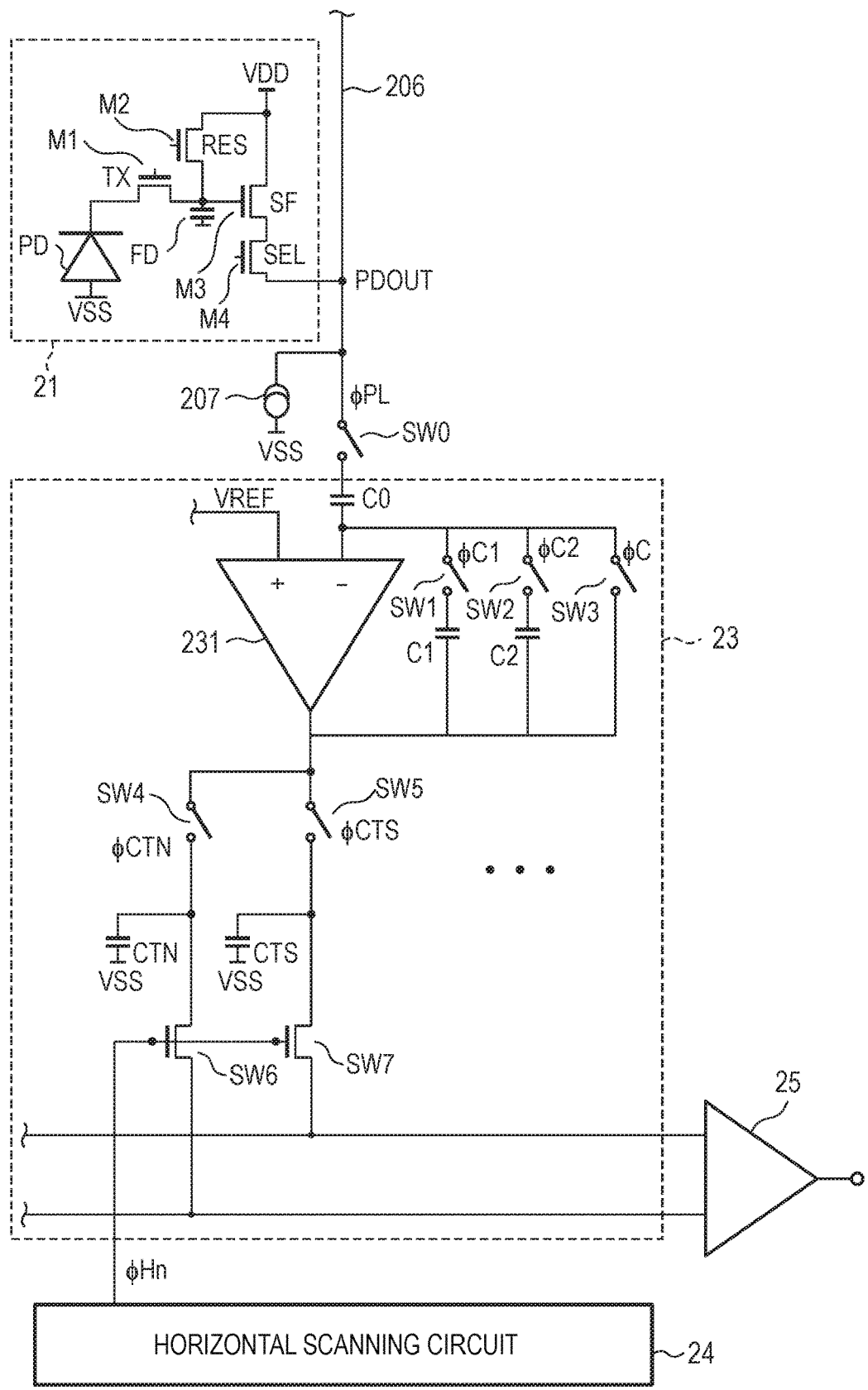
FIG. 3 is a circuit diagram of a pixel and a column amplifier unit of the solid state imaging device in the first embodiment.

FIG. 3 is a circuit diagram of the pixel 21 and the column amplifier unit 23 of the solid state imaging device 2 in the present embodiment. Here, to simplify the illustration, a circuit for one column of the column amplifier unit 23 and one pixel 21 are illustrated. The pixel 21 has the photoelectric conversion element PD, a floating diffusion capacitor FD, a transfer transistor M1, a reset transistor M2, an amplification transistor M3, and a select transistor M4. Note that the pixel 21 may be configured such that a plurality of photoelectric conversion elements PD share the floating diffusion capacitor FD, the reset transistor M2, the amplification transistor M3, and the select transistor M4. Further, each of the transistors M2 to M4 is not limited to an N-channel MOS and may be formed of a P-channel MOS.

The photoelectric conversion element PD is formed of a photodiode or the like and photoelectrically converts an irradiated light into electrons (charges). A signal TX is supplied to the gate of the transfer transistor M1, and when the signal TX transitions to a high level, the transfer transistor M1 transfers charges generated in the photoelectric conversion element PD to the floating diffusion capacitor FD. The floating diffusion capacitor FD also serves as the drain terminal of the transfer transistor M1 and can hold charges transferred from the photoelectric conversion element PD via the transfer transistor M1. A signal RES is supplied to the gate of the reset transistor M2, and when the signal RES transitions to a high level, the reset transistor M2 resets the voltage of the floating diffusion capacitor FD to a reset voltage VDD. The transfer transistor M1 and the reset transistor M2 are simultaneously turned on, and thereby electrons of the photoelectric conversion element PD are reset. The gate of the amplification transistor M3 is connected to the floating diffusion capacitor FD.

The source of the amplification transistor M3 is electrically connected to a node PDOUT of the vertical signal line 206 common to each column via the select transistor M4 and forms a source follower. A signal SEL is applied to the gate of the select transistor M4, and when the signal SEL transitions to a high level, the vertical signal line 206 and the amplification transistor M3 are electrically connected to each other. Thereby, a pixel signal is read out from the selected pixel 21.

The signal TX, the signal RES, and the signal SEL supplied to the pixel 21 are output from the vertical scanning circuit 22. The vertical scanning circuit 22 controls the level of these signals and thereby scans the pixels 21 on a row basis. A current source 207 supplies a current to the pixel 21 via the vertical signal line 206, and the vertical signal line 206 is connected to the column amplifier unit 23 via a switch SW0 driven by a signal PL.

The column amplifier unit 23 has a column amplifier 231, an input capacitor C0, feedback capacitors C1 and C2, switches SW1 to SW7, and capacitors CTN and CTS. The column amplifier 231 is formed of a differential amplifier circuit having an inverting input node, a non-inverting input node, and an output node. The inverting input node of the column amplifier 231 is electrically connected to the vertical signal line 206 via the switch SW0 and the input capacitor C0, and a reference voltage VREF is applied to the non-inverting input node. The inverting input node and the output node are connected to each other via three feedback circuits connected in parallel. A first feedback circuit is formed of the switch SW1 and the feedback capacitor C1 connected in series, a second feedback circuit is formed of the switch SW2 and the feedback capacitor C2 connected in series, and a third feedback circuit is formed of the switch SW3. By appropriately controlling turning on or off of the switches SW1 to SW3, it is possible to change the amplification factor of the column amplifier 231. That is, when only the switch SW1 is turned on, the amplification factor is C0/C1, and when only the switch SW2 is turned on, the amplification factor is C0/C2. Further, when the switches SW1 and SW2 are turned on, the amplification factor is C0/(C1+C2), and when only the switch SW3 is turned on, the column amplifier 231 operates as a voltage follower. The switches SW1 to SW3 are controlled by signals φC to φC2, respectively.

The output node of the column amplifier 231 is connected to the capacitor CTN via the switch SW4 controlled by a signal φCTN. Similarly, the output node of the column amplifier 231 is connected to the capacitor CTS via the switch SW5 controlled by the signal φCTS. At the time of reset of the floating diffusion capacitor FD, the switch SW4 is turned on, the switch SW5 is turned off, and a pixel signal (N-signal) at the time of reset is sampled and held in the capacitor CTN. After photoelectrically converted charges are transferred to the floating diffusion capacitor FD, the switch SW4 is turned off, the switch SW5 is turned on, and a pixel signal (S-signal) based on photoelectrically converted charges are sample and held in the capacitor CTS.

The capacitor CTN is connected to the first input node of the output unit 25 via the switch SW6, the capacitor CTS is connected to the second input node of the output unit 25 via the switch SW7. When the horizontal scanning circuit 24 sequentially controls signals φHn on respective columns to the high level, a horizontal scan is performed. That is, once the signal φHn transitions to the high level, the switch SW6 outputs an N-signal held in the capacitor CTN to the first input node of the output unit 25, and the switch SW7 outputs an S-signal held in the capacitor CTS to the second input node of the output unit 25.

The output unit 25 is formed of a differential amplifier circuit and, by amplifying and outputting a difference between the input S-signal and N-signal, outputs a pixel signal from which a noise component at the time of reset has been removed. Note that correlated double sampling may be performed after analog-to-digital conversion is performed on the N-signal and the S-signal.

Figures 4A, 4B:
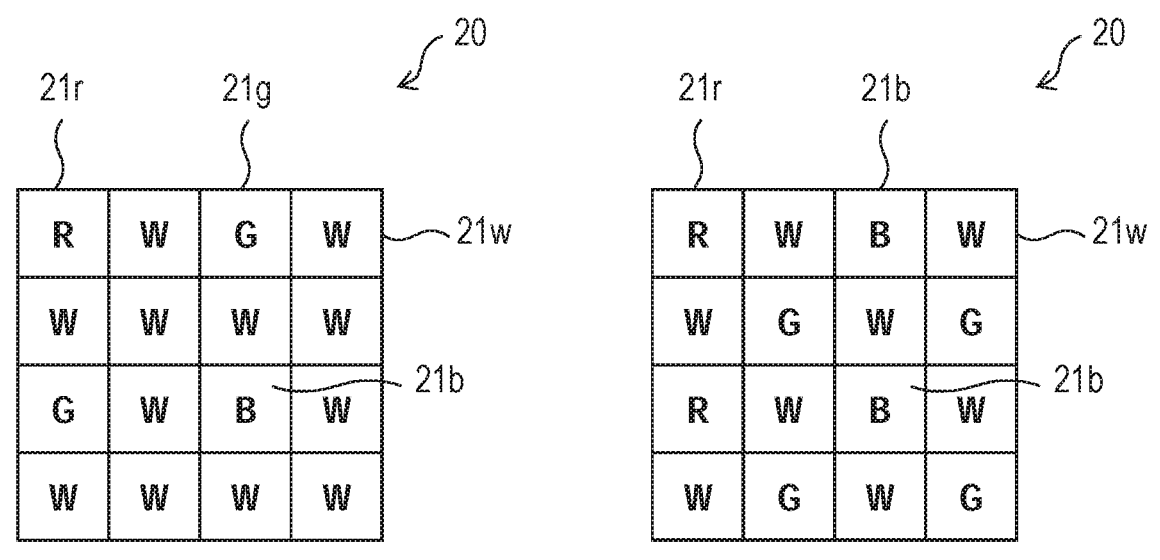

FIG. 4A and FIG. 4B are schematic diagrams of color filters of the pixel unit in the present embodiment. FIG. 4A illustrates one example of color filter arrangement in the present embodiment. While only the block of 16 pixels of 4×4 is illustrated in FIG. 4A, a plurality of pixel blocks are included in the pixel unit. In FIG. 4A, the pixel unit 20 has an R pixel having a color filter 21r, G pixels each having a color filter 21g, a B pixel having a color filter 21b, and W pixels each having a clear filter 21w. A red pixel (R pixel), green pixels (G pixels), a blue pixel (B pixel), and white pixels (W pixels) are arranged in accordance with predetermined arrangement, and eight W pixels (first pixel) are arranged around each color pixel of the R pixel, the G pixel, and the B pixel (second pixel, third pixel). That is, W pixels are arranged adjacent to each color pixel in each of the vertical direction, the horizontal direction, and the diagonal directions. Out of 16 pixels of 4×4, respective pixels are arranged at a ratio of R:G:B:W=1:2:1:12 in terms of the number of pixels. This arrangement is referred to as RGBW12 arrangement. In the RGBW12 arrangement, the ratio of W pixels occupies three quarters of all the pixels. That is, the RGBW12 arrangement has the W pixel as a first pixel group and the color pixels (RGB pixel) as a second pixel group. The total number of W pixels of the first pixel group is three or more times (more than two times) the total number of color pixels of the second pixel group, and the first pixels have higher sensitivity than the second pixels. That is, the first pixel group has more luminance information (resolution information) than the second pixel group. Further, the first pixel group has a spectral sensitivity characteristic having a wider half-width value than a spectral sensitivity characteristic of the second pixel group.

FIG. 4B illustrates another example of color filter arrangement in the present embodiment. Out of 16 pixels of 4×4, respective pixels are arranged at a ratio of R:G:B:W=1:2:1:4 in terms of the number of pixels. Further, although not illustrated, color pixels in subtractive mixture of colors of cyan pixels (Cy pixel), magenta pixels (Mg pixel), and yellow pixels (Ye pixel) may be used instead of color pixels in additive mixture of colors of R pixels, G pixels, and B pixels. Further, instead of the W pixel, the G pixel or the Ye pixel that can output a pixel signal including a luminance component may be used as the first pixel. The solid state imaging device 2 in the present embodiment can have higher sensitivity than a solid state imaging device having the Bayer arrangement. The W pixel may have sensitivity in a wavelength range that can be detected by the photoelectric conversion element PD in addition to the visible wavelength range. Note that the solid state imaging device 2 may include pixels that do not output an image, such as an optical black pixel, a dummy pixel having no photoelectric conversion unit, or the like other than effective pixels. However, such an optical black pixel or a dummy pixel is not included in the first pixel or the second pixel.

In the solid state imaging device 2 having the color filter described above, a signal of a particular color component (information) is output from each pixel. The signal processing unit 3 described later produces a high definition color image by generating a signal of other color components by using an interpolation process. For example, while the R pixel has no information on G or B, it is possible to estimate pixel values of G or B at a position of the R pixel based on values of the G pixel and the B pixel located near the R pixel.

FIG. 5 is a block diagram of a signal processing unit (image processing device) in the present embodiment. The signal processing unit 3 has a pre-processing unit 310, a luminance interpolation unit (first interpolation unit) 320, an interpolation pixel select unit 330, a color interpolation unit (second interpolation unit) 360, and a color composite processing unit (color composite unit) 370. A pixel signal from the solid state imaging device 2 is input to the pre-processing unit 310. While description is provided under the assumption that the solid state imaging device 2 has the RGBW12 arrangement, another pixel arrangement may be used. Each unit forming the signal processing unit 3 will be described below one by one.

Pre-Processing Unit

The pre-processing unit 310 performs various correction including offset correction or gain correction of a pixel signal. When a pixel signal output from the solid state imaging device 2 is an analog signal, A/D conversion may be performed in the pre-processing unit 310. The pre-processing unit 310 appropriately performs offset (OFFSET) correction, gain (GAIN) correction, or the like of an input pixel signal Din and generates a corrected output Dout. This process is typically expressed by Equation (1) below.

$$Dout = (Din - OFFSET) \times GAIN \quad (1)$$

This correction may be performed for each of various circuits. For example, correction may be performed on a pixel basis, and in addition, correction may be performed on a circuit basis for each of a column amplifier, an analog-to-digital conversion unit (ADC), or an output amplifier. With such correction, so-called fixed pattern noise is reduced, and a higher quality image can be obtained. Further, a gain value of an image is stored together with an aperture value, a shutter speed, and a distance value. The output Dout in each pixel is output from the pre-processing unit 310 as an RGBW image and held in the memory 5 or a buffer memory of the signal processing unit 3.

Luminance Interpolation Unit

The luminance interpolation unit 320 generates a luminance interpolation value (iW value) at each color pixel in a signal output from the pre-processing unit 310. FIG. 6 is a diagram illustrating an interpolation process in the RGBW12 arrangement illustrated in FIG. 4A. In FIG. 6, pixels of 4×4 are illustrated over rows (the vertical direction) and columns (the horizontal direction), and each symbol "?" indicates that the W value at each color pixel of RGB is unknown. That is, the W values of the R pixel (1, 1), the G pixel (3, 1), the G pixel (1, 3), and the B pixel (3, 3) are unknown. The luminance interpolation unit 320 generates the W value at a color pixel by interpolation. Hereinafter, an interpolated W value is denoted as iW, and interpolated W values of an R pixel, a G pixel, and a B pixel are denoted as iWr, iWg, and iWb, respectively. For example, the iWb(3, 3) of the B pixel (3, 3) is calculated in accordance with Equation (2) as the average value of the W pixels (2, 2), (3, 2), (4, 2), (2, 3), (4, 3), (2, 4), (3, 4), and (4, 4) around the B pixel (3, 3).

$$iWb_{(3,3)} = \frac{W_{(2,2)} + W_{(3,2)} + W_{(4,2)} + W_{(2,3)} + W_{(4,3)} + W_{(2,4)} + W_{(3,4)} + W_{(4,4)}}{8} \quad (2)$$

Similarly, iWr of the R pixel and iWg of the G pixel are calculated as the average of W values of the surrounding eight W pixels. Further, the average value may be calculated by multiplying respective values of the W pixels used for interpolation by weighting coefficients in accordance with the distances from an interpolation target color pixel. Note that directions of a change in the luminance value may be detected vertically, horizontally, and diagonally, and the average of pixels in a direction of a small change rate may be calculated, as with a bilinear interpolation method, a bi-cubic interpolation method, or the like. Since the number of W pixels used for obtaining resolution information is large in the RGBW12 arrangement, accuracy in the directivity detection is improved, and thereby accurate interpolation can be performed also on a subject with a high spatial frequency. In such a way, the luminance interpolation unit 320 outputs a luminance image imW including respective values of iWr, iWg, and iWb generated by interpolation at color pixels and W values of W pixels.

In the RGBW12 arrangement, since the number of W pixels used for obtaining resolution information is large, information having a high spatial frequency can be acquired compared to other color filter arrangement such as the Bayer arrangement. Therefore, interpolation of a W value at a color pixel can be accurately performed. By increasing accuracy of interpolation of a W value, it is possible to improve resolution of an image and accurately perform a process in the post-stage interpolation pixel select unit.

Interpolation Pixel Select Unit

The interpolation pixel select unit 330 selects color pixels used for color interpolation by using luminance interpolation values iW at color pixels and outputs the address of the selected color pixels. The process in the interpolation pixel select unit 330 will be described below with reference to FIG. 7A, FIG. 7B, and FIG. 7C.

FIG. 7A illustrates a pixel block of a calculation region in the present embodiment. An interpolation process and a de-mosaic process described later may be performed on a calculation region basis, and the calculation region may be formed of 9×9 pixels, for example. In the pixel block in FIG. 7A, it is assumed that a red light enters a hatched region A and a white light enters the other region B. Further, the W pixel (6, 5) surrounded by a bold line indicates an interpolation target pixel, and color values of R, G, and B at the W pixel (6, 5) is generated by interpolation. Herein, as a comparative example, a process for selecting color pixels present within a calculation region of the 9×9 pixels and determining the average value of the selected color pixels as an interpolation value will be described. It is assumed that nine R pixels (1, 1), (1, 5), (1, 9), (5, 1), (5, 5), (5, 9), (9, 1), (9, 5), and (9, 9) are selected in order to interpolate the R value at the W pixel (6, 5). Out of the nine pixels, the R pixels (1, 1), (1, 5), (1, 9), (5, 1), and (9, 1) are located in the region A which a red light enters. On the other hand, the interpolation target W pixel (6, 5) is located in the region B which a white light enters. When interpolation based on the R pixel located in the red region A is performed on the W pixel (6, 5) located in the white region B, color blur phenomenon may occur. For example, a phenomenon in which a white region is blurred with red near the edge of a subject may occur. In this example, one conceivable way is to perform an averaging process based on a weighting in accordance with the distances from an interpolation target. In this case, however, since the R pixel used for color interpolation is still located in the region A which a red light enters, a color blur phenomenon may occur. The interpolation pixel select unit 330 in the present embodiment solves the problem described above by using a process described in detail below.

FIG. 7B illustrates a pixel block after luminance interpolation in the present embodiment. The interpolation pixel select unit 330 avoids the color blur phenomenon described above by selecting color pixels within the region B in which the interpolation target W pixel (6, 5) is located. That is, the interpolation pixel select unit 330 selects a color pixel used for interpolation based on the luminance value at a color pixel located within a calculation region. As expressed by the following equation, the interpolation pixel select unit 330 determines whether or not to use a pixel (i,j) for interpolation based on a comparison between a predetermined threshold th and the absolute value of a difference (finite difference) between a luminance value W(6, 5) of the interpolation target W pixel and a luminance interpolation value iW(i,j).

$$|W(6,5) - iW(i,j)| > th \quad (3)$$

If the above equation is true, that is, if the finite difference between luminance values is larger than the threshold, it is determined that a pixel (i,j) is not used for interpolation. Further, if the above equation is false, that is, if the finite difference between luminance values is less than or equal to the threshold, it is determined that a pixel (i,j) is used for interpolation. The threshold th may be a predefined fixed value or may be dynamically determined based on a pixel value around an interpolation target pixel. Further, it is preferable that the threshold th be a value larger than random noise of a pixel value.

In a captured image, since there is correlation between a color change and a luminance change, an edge of a color of a subject can be estimated based on the luminance change. The interpolation pixel select unit 330 selects an interpolation target color pixel based on the finite difference between luminance values and thereby performs color interpolation between pixels having less color change. That is, when the finite difference between luminance values is large, it may be determined that two pixels have different colors. On the other hand, when the finite difference between luminance values is small, it may be determined that two pixels have the same color. The interpolation pixel select unit 330 performs the determination described above on all the color pixels included in a calculation region subjected to an interpolation process and outputs address information on the selected pixels. FIG. 7C illustrates one example of address information on selected pixels. In the address information, each color pixel which is selected for interpolation is represented by "1", and each color pixel which is not selected is represented by "0". In the address information of FIG. 7C, each color pixel located in the white region B is selected as a pixel used for interpolation and represented by "1". On the other hand, each color pixel located in the red region A is not used for interpolation and thus is represented by "0". The address information is generated for each of the W pixels and output to the color interpolation unit 360.

Color Interpolation Unit

The color interpolation unit 360 generates each value of color interpolation values iR, iG, and iB and luminance interpolation values iWr, iWg, and iWb for each pixel by an interpolation process. An RGBW image output from the pre-processing unit 310, a luminance image imW output from the luminance interpolation unit 320, and address information output from the interpolation pixel select unit 330 are input to the color interpolation unit 360. The color interpolation unit 360 performs the interpolation process by using pixels designated by address information from the interpolation pixel select unit 330. The address information illustrated in FIG. 7C indicates 16 pixels (3, 3), (3, 5), (3, 7), (3, 9), (5, 3), (5, 5), (5, 7), (5, 9), (7, 3), (7, 5), (7, 7), (7, 9), (9, 3), (9, 5), (9, 7), and (9, 9) as pixels used for interpolation. For example, as illustrated in FIG. 8A, the color interpolation value iR at the interpolation target W pixel (6, 5) is calculated by interpolation using four R pixels (5, 5), (5, 9), (9, 5), and (9, 9). That is, the iR value (6, 5) is calculated by the average value of four selected pixels in a luminance image im(i,j) in accordance with Equation (4).

$$iR_{(6,5)} = \frac{im_{(5,5)} + im_{(5,9)} + im_{(9,5)} + im_{(9,9)}}{4} \quad (4)$$

Similarly, the color interpolation value iG at the W pixel (6, 5) is calculated by interpolation using four G pixels (3, 5), (3, 9), (5, 3), (5, 7), (7, 5), (7, 9), (9, 3), and (9, 7) (FIG. 8B). The color interpolation value iB at the W pixel (6, 5) is calculated by interpolation using the selected B pixels (3, 3), (3, 7), (7, 3), and (7, 7) (FIG. 8C).

The color interpolation unit 360 further generates luminance interpolation values iWr, iWg, and iWb at the W pixel (6, 5) by interpolation using the luminance image imW. The luminance interpolation values iWr, iWg, and iWb are generated by referencing the W pixel at the color pixels, as described above. For example, as illustrated in FIG. 8D, the pixels (5, 5), (5, 9), (9, 5), and (9, 9) out of the pixels designated by address information are used for interpolation, and thereby the luminance interpolation value iWr at the pixel (6, 5) is calculated. That is, the luminance interpolation value iWr(6, 5) is calculated as the average value of the luminance image imW(i,j) in accordance with Equation (5).

$$iWr_{(6,5)} = \frac{iWr_{(5,5)} + iWr_{(5,9)} + iWr_{(9,5)} + iWr_{(9,9)}}{4} \quad (5)$$

Similarly, the luminance interpolation value iWg at the W pixel (6, 5) is calculated by interpolation using the luminance interpolation value iWg at the pixels (3, 5), (3, 9), (5, 3), (5, 7), (7, 5), (7, 9), (9, 3), and (9, 7) (FIG. 8E). Furthermore, the luminance interpolation value iWb at the W pixel (6, 5) is calculated by interpolation using the luminance interpolation value iWb at the pixels (3, 3), (3, 7), (7, 3), and (7, 7) (FIG. 8F). According to the above process, image information in which each pixel has each value of R, G, B, iWr, iWg, and iWb is output.

In the above description, while calculated by simply averaging a plurality of pixel values, an interpolation value may be calculated by using a weighting average in accordance with the distances from the interpolation target pixel. For example, a weighting coefficient may be larger for a pixel closer to an interpolation target pixel. Further, the weighting coefficient may be determined in accordance with the Gaussian distribution. Furthermore, the calculation region of an interpolation process is not limited to 9×9 pixels, and the calculation region may be dynamically changed in accordance with a subject.

Color Composite Processing Unit

The color composite processing unit 370 combines color interpolation values iR, iG, and iB, luminance interpolation values iWr, iWg, and iWb, color values R, G, and B, and a luminance value W and generates an R image, a G image, and a B image, respectively. For example, each value of R, G, and B at the pixel (6, 5) can be calculated from Equations (6), (7), and (8) below.

$$R\_out_{(6,5)} = \frac{\frac{iR_{(6,5)}}{iWr_{(6,5)}}}{\frac{iR_{(6,5)}}{iWr_{(6,5)}} + \frac{iG_{(6,5)}}{iWg_{(6,5)}} + \frac{iB_{(6,5)}}{iWb_{(6,5)}}} \times W_{(6,5)} \quad (6)$$

$$G\_out_{(6,5)} = \frac{\frac{iG_{(6,5)}}{iWg_{(6,5)}}}{\frac{iR_{(6,5)}}{iWr_{(6,5)}} + \frac{iG_{(6,5)}}{iWg_{(6,5)}} + \frac{iB_{(6,5)}}{iWb_{(6,5)}}} \times W_{(6,5)} \quad (7)$$

$$B\_out_{(6,5)} = \frac{\frac{iB_{(6,5)}}{iWb_{(6,5)}}}{\frac{iR_{(6,5)}}{iWr_{(6,5)}} + \frac{iG_{(6,5)}}{iWg_{(6,5)}} + \frac{iB_{(6,5)}}{iWb_{(6,5)}}} \times W_{(6,5)} \quad (8)$$

The first items on the right side of Equations (6), (7), and (8) indicate normalized values of color ratios of R, G, and B by using luminance interpolation values iWr, iWg, and iWb, respectively. By multiplying each color ratio of the first item on the right side by a W value on the second item on the right side, each pixel value of R, G, and B is calculated. The color composite processing unit 370 repeatedly performs the process described above for all the pixels in the calculation region and outputs a de-mosaicked color image made of an R image, a G image, and a B image.

As described above in detail, in the present embodiment, color pixels each having a luminance value whose absolute value of the difference from a luminance value of a predetermined interpolation target W pixel is less than or equal to a predetermined value are selected, and color interpolation is performed based on the selected color pixels. By performing color interpolation by using color pixels each having a small absolute value of the difference from the luminance value of the interpolation target W pixel, it is possible to perform color interpolation in accordance with a pattern of a subject. Accordingly, it is possible to suppress a false color such as color blur in the edge portion or the like of a subject, for example, and it is possible to provide a high quality image.

Further, a color interpolation process in the present embodiment is performed between pixels of an image of one frame and does not require a process between a plurality of frames. Thus, no frame memory is required to be provided, which facilitates implementation of the signal processing unit to a hardware component such as a Field Programable Gate Array (FPGA), an Application Specific Integrated Circuit (ASIC), or the like.

Second Embodiment

Next, an imaging apparatus in a second embodiment will be described. The imaging apparatus in the present embodiment can perform an exception process when the color pixel for color interpolation is not selected. Features different from those in the first embodiment will be mainly described below.

Figure 9:
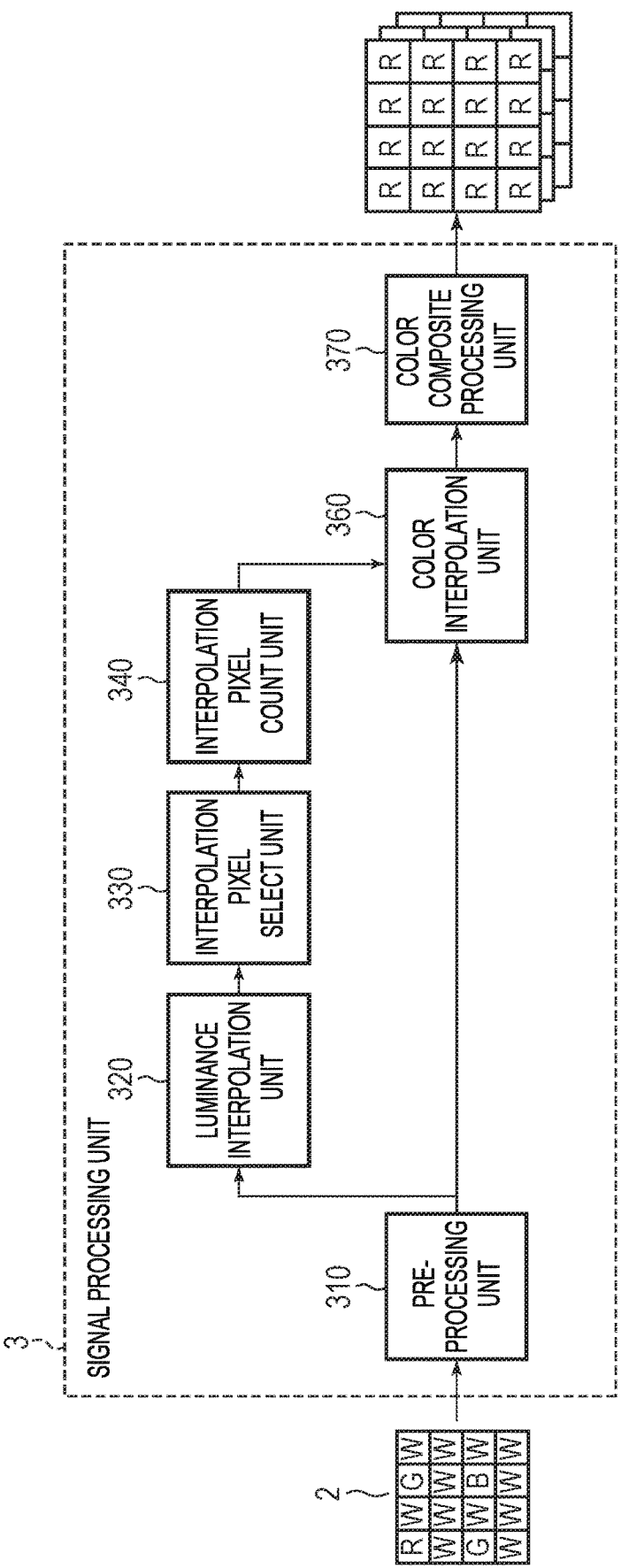
FIG. 9 is a block diagram of a signal processing unit in a second embodiment.

FIG. 9 is a block diagram of a signal processing unit in the present embodiment. The signal processing unit 3 further has an interpolation pixel count unit (pixel counting unit) 340 in addition to the pre-processing unit 310, the luminance interpolation unit 320, the interpolation pixel select unit 330, the color interpolation unit 360, and the color composite processing unit 370. The interpolation pixel count unit 340 counts the number of pixels selected by the interpolation pixel select unit 330 and outputs count values R_count, G_count, and B_count in association with color pixels of R, G, and B. When any of the count values of R, G, and B is "0", that is, when no color pixel used for interpolation is selected, the color interpolation unit 360 performs an exception process. The exception process may be a process for averaging color values of other color pixels within a calculation region.

Figure 10B:
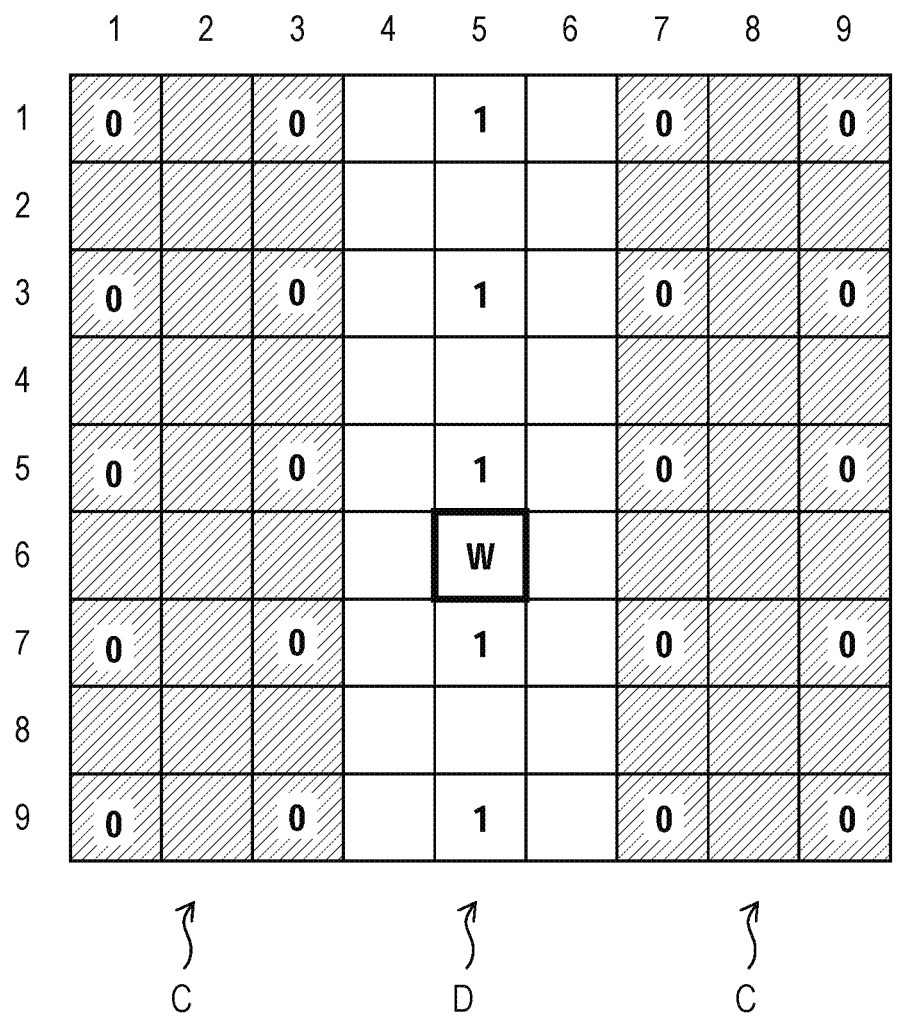

The process in the imaging apparatus in the present embodiment will be described with specific examples. For example, it is assumed that, in a calculation region illustrated in FIG. 10A, a black subject is projected on a hatched region C and a white subject is projected on a region D. Here, color pixels selected for the interpolation target W pixel (6, 5), that is, color pixels each having a finite difference from the luminance value of the W pixel (6, 5) that is less than or equal to the threshold th are R pixels (1, 5), (5, 5), and (9, 5) and G pixels (3, 5) and (7, 5). In this case, address information generated by the interpolation pixel select unit 330 is as illustrated in FIG. 10B. In FIG. 10B, since none of color pixels in the region C is selected as an interpolation pixel, these color pixels are represented by "0". The interpolation pixel count unit 340 counts the number of interpolation target color pixels based on the address information. The respective count values of an R pixel, a G pixel, and a B pixel are expressed as below.

R_count=3
G_count=2
B_count=0

Since no B pixel is present in the calculation region, the color interpolation unit 360 is unable to interpolate the B value of the W pixel (6, 5) based on a B pixel. In such a case, the color interpolation unit 360 performs an exception process and generates, as the color interpolation value iB of the W pixel (6, 5), the average value for R pixels and G pixels other than a B pixel. This can avoid a result in which no color interpolation value is generated.

FIG. 11A to FIG. 11F illustrate an interpolation process in a pixel block of a calculation region illustrated in FIG. 10A. As illustrated in FIG. 11A, the R value at the interpolation target W pixel (6, 5) is calculated by interpolation using three R pixels (1, 5), (5, 5), and (9, 5). Similarly, the G value at the W pixel (6, 5) is calculated by interpolation using the G pixels (3, 5) and (7, 5) (FIG. 11B). The B value at the W pixel (6, 5) is calculated by interpolation using R pixels and G pixels in accordance with the exception process (FIG. 11A, FIG. 11B) without using the B pixels (3, 3), (3, 7), (7, 3), and (7, 7) (FIG. 11C). The color interpolation unit 360 further generates luminance interpolation values iWr, iWg, and iWb at the W pixel (6, 5) by interpolation using a luminance image imW. The luminance interpolation values iWr, iWg, and iWb are generated by interpolation at color pixels, as described above. For example, as illustrated in FIG. 11D, the luminance interpolation values iWr(1, 5), (5, 5), and (9, 5) designated by address information are used for interpolation, and thereby the luminance interpolation value iWr at the pixel (6, 5) is calculated. Similarly, the luminance interpolation value iWg at the W pixel (6, 5) is calculated by interpolation using the luminance interpolation values iWg at the pixels (3, 5) and (7, 5) (FIG. 11E). Furthermore, the luminance interpolation value iWb at the pixel (6, 5) is calculated by interpolation using the luminance interpolation values iWr and iWg in accordance with an exception process (FIG. 11D, FIG. 11E) without using the luminance interpolation values iWb at the pixels (3, 3), (3, 7), (7, 3), and (7, 7) (FIG. 11F). According to the above process, image information in which each pixel has each value of R, G, B, iWr, iWg, and iWb is output. The color composite processing unit 370 generates an R image, a G image, and a B image by color-composition of each value of R, G, B, iWr, iWg, and iWb and the W value.

As described above, according to the present embodiment, even when no color pixel used for interpolation is selected within a calculation region, color interpolation is enabled, and a color image can be generated. Note that an exception process is not limited to the example described above, any type of process may be employed as long as it is a process that can estimate the color value of an interpolation target pixel.

Third Embodiment

Next, an imaging apparatus in a third embodiment will be described. The imaging apparatus in the present embodiment can detect a false color by using the count value in the second embodiment. Features different from those of the first embodiment will be mainly described below.

Figure 12:
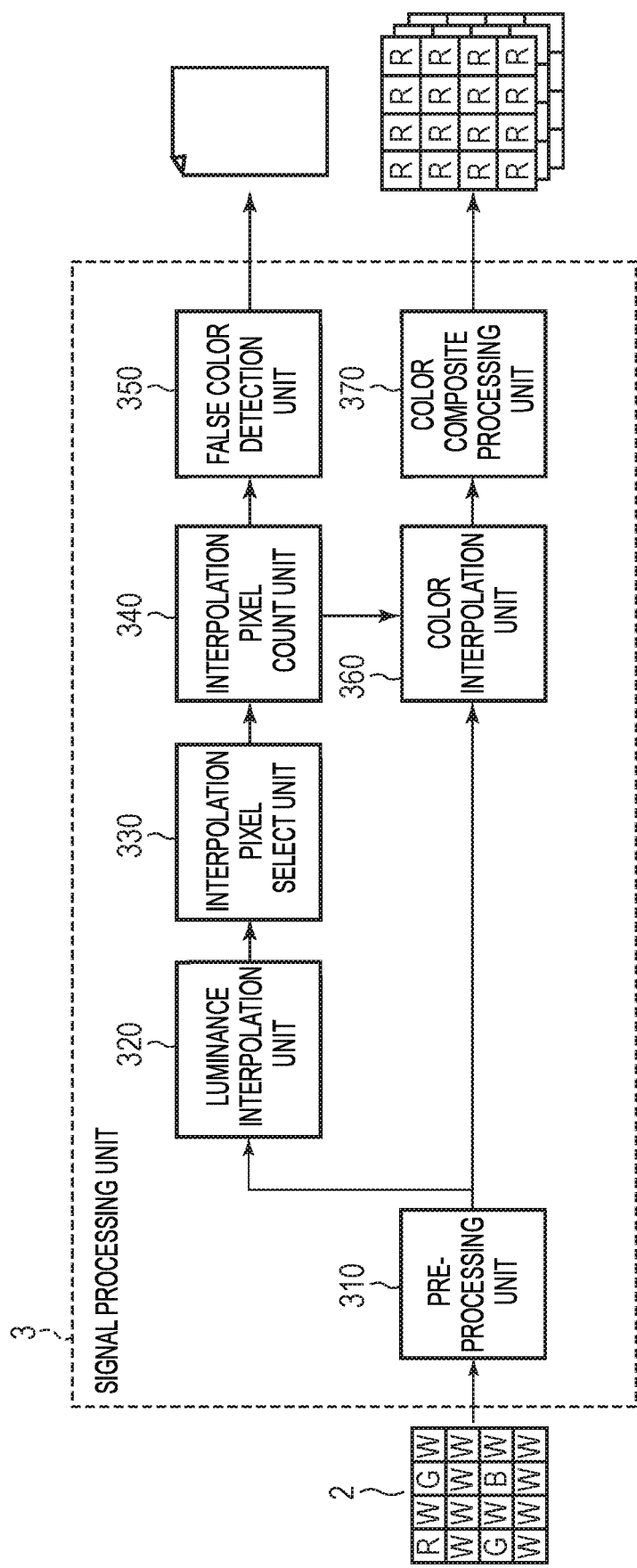
FIG. 12 is a block diagram of a signal processing unit in a third embodiment.

FIG. 12 is a block diagram of a signal processing unit in the present embodiment. The signal processing unit 3 further has a false color detection unit 350 in addition to the pre-processing unit 310, the luminance interpolation unit 320, the interpolation pixel select unit 330, the color interpolation unit 360, the color composite processing unit 370, and the interpolation pixel count unit 340. The false color detection unit 350 performs false color determination by using an output result of the interpolation pixel count unit 340.

In the second embodiment described above, when no color pixel is selected by the interpolation pixel select unit 330, interpolation using all the color pixels in a calculation region is performed. When interpolation is performed by using other color pixels in such a way, a false color may occur. In the present embodiment, the false color detection unit 350 detects that the count value of the interpolation pixel count unit 340 becomes "0" and outputs false color information on an interpolation target pixel corresponding to this count value. The false color information may be address information in which the address (coordinates) of a pixel where a false color may occur is expressed in a form of a map. For example, in FIG. 10B, since the count value B_count corresponding to the W pixel (6, 5) is "0", the coordinates at the W pixel (6, 5) are written to the address information.

According to the present embodiment, by outputting false color information together with a color image, it is possible to perform processing while avoiding a pixel at which a false color is occurring in image recognition, for example, and it is possible to avoid erroneous recognition due to a false color. Further, another image processing such as an interframe process may be performed to reduce a false color.

Fourth Embodiment

Figure 13:
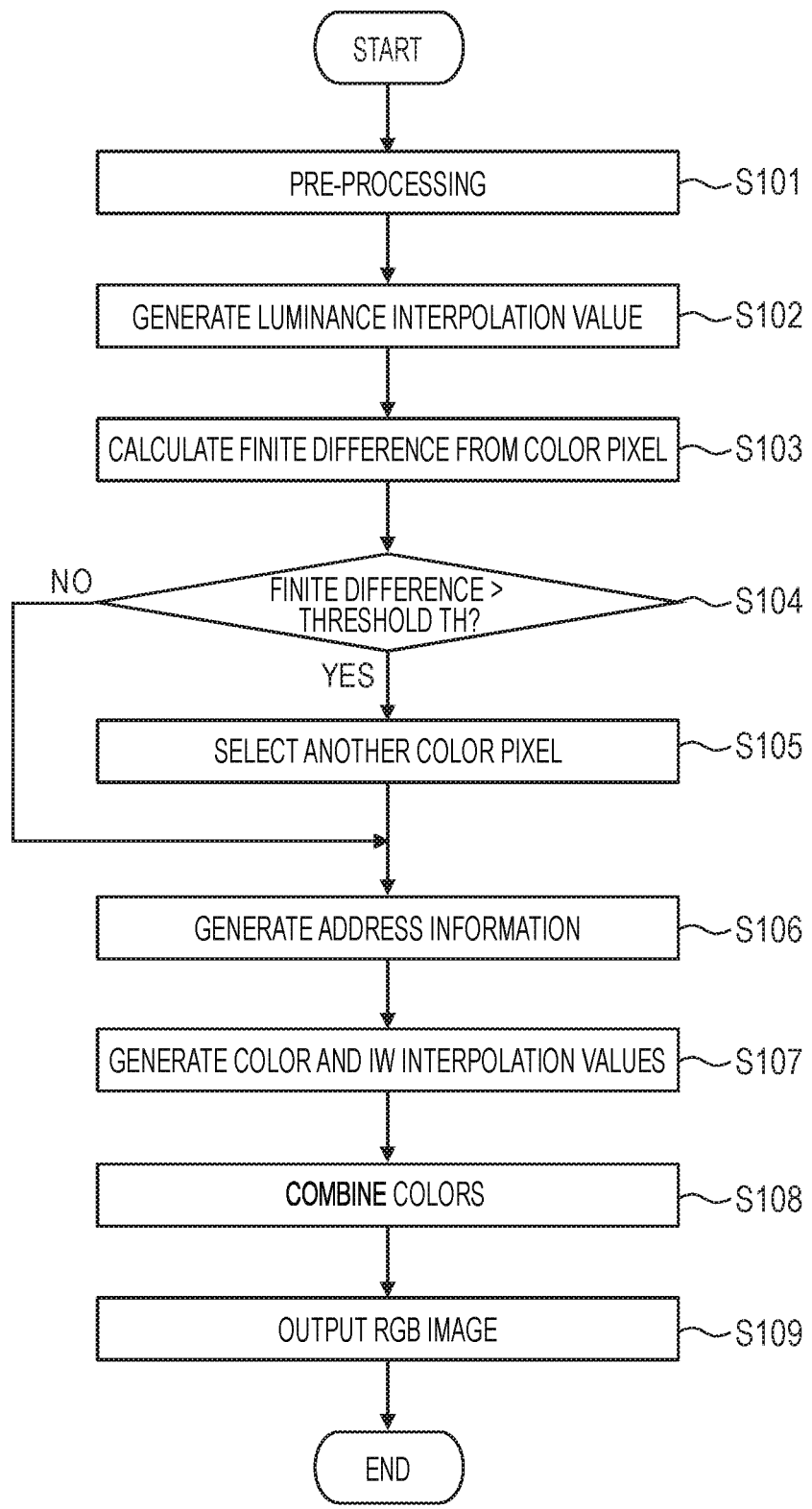
FIG. 13 is a flowchart illustrating a signal processing method in a fourth embodiment.

FIG. 13 is a flowchart illustrating an image processing method in the present embodiment and illustrates a general operation of the signal processing unit 3 in the first to third embodiments. The flowchart of FIG. 13 will be described below with reference to the configuration in the first to third embodiments.

In step S101, the pre-processing unit 310 of the signal processing unit 3 performs various correction including offset correction or gain correction in a pixel signal output from the solid state imaging device 2 and outputs respective color values of R, G, and B pixels and an RGBW image of the W pixel.

In step S102, the luminance interpolation unit 320 generates a luminance interpolation value (iW value) for each of color pixels. As described above, the iW value at a color pixel may be interpolated based on W values of W pixels around a color pixel. In interpolation of a luminance value, a simple average for the W pixels may be used, or a weighting average in accordance with the distances between a color pixel to be an interpolation target and the W pixels may be used.

In step S103, the interpolation pixel select unit 330 calculates a finite difference between the predetermined threshold th and the absolute value of a difference (finite difference) between the luminance value W of the interpolation target W pixel and the luminance interpolation value iW of a color pixel. If the finite difference from the luminance interpolation value iW of a color pixel is less than or equal to the threshold th (step S104, NO), the interpolation pixel select unit 330 selects the color pixel for interpolation. If the finite difference from the luminance interpolation value iW of a color pixel exceeds the threshold, it is estimated that the color pixel and the interpolation target W pixel are different in the color component. That is, if there is no color pixel whose finite difference from the luminance value of the interpolation target W pixel is less than or equal to the threshold th in the calculation region (step S104, YES), the interpolation pixel select unit 330 selects a color pixel of another color component (step S105). For example, if there is no R pixel whose finite difference is less than or equal to the threshold th in the calculation region, the interpolation pixel select unit 330 selects a B pixel or a G pixel as another color pixel, for example.

In step S106, the interpolation pixel select unit 330 generates address information indicating the selected color pixel. The address information includes the coordinates and the count value (R_count, G_count, or B_count) of the selected color pixel for each interpolation target W pixel. When the count value is zero or small, interpolation using color pixels each having a large luminance difference is performed, and a false color may occur. Therefore, a pixel at which a false color may occur can be identified by referencing the count value.

In step S107, the color interpolation unit 360 generates each value of color interpolation values iR, iG, and iB and luminance interpolation values iWr, iWg, and iWb for each pixel of the calculation region by an interpolation process.

The RGBW image output from the pre-processing unit 310, the luminance image imW output from the luminance interpolation unit 320, and address information output from the interpolation pixel select unit 330 are input to the color interpolation unit 360. The color interpolation unit 360 performs the interpolation process by using pixels designated by the address information from the interpolation pixel select unit 330.

In step S108, the color composite processing unit 370 combines color interpolation values iR, iG, and iB, luminance interpolation values iWr, iWg, and iWb, color values R, G, and B, and a luminance value W and produces an R image, a G image, and a B image, respectively. Thereby, de-mosaicked color image from the RGBW image, that is, the R image, the G image, and the B image are output (step S109).

Fifth Embodiment

Figure 14A:
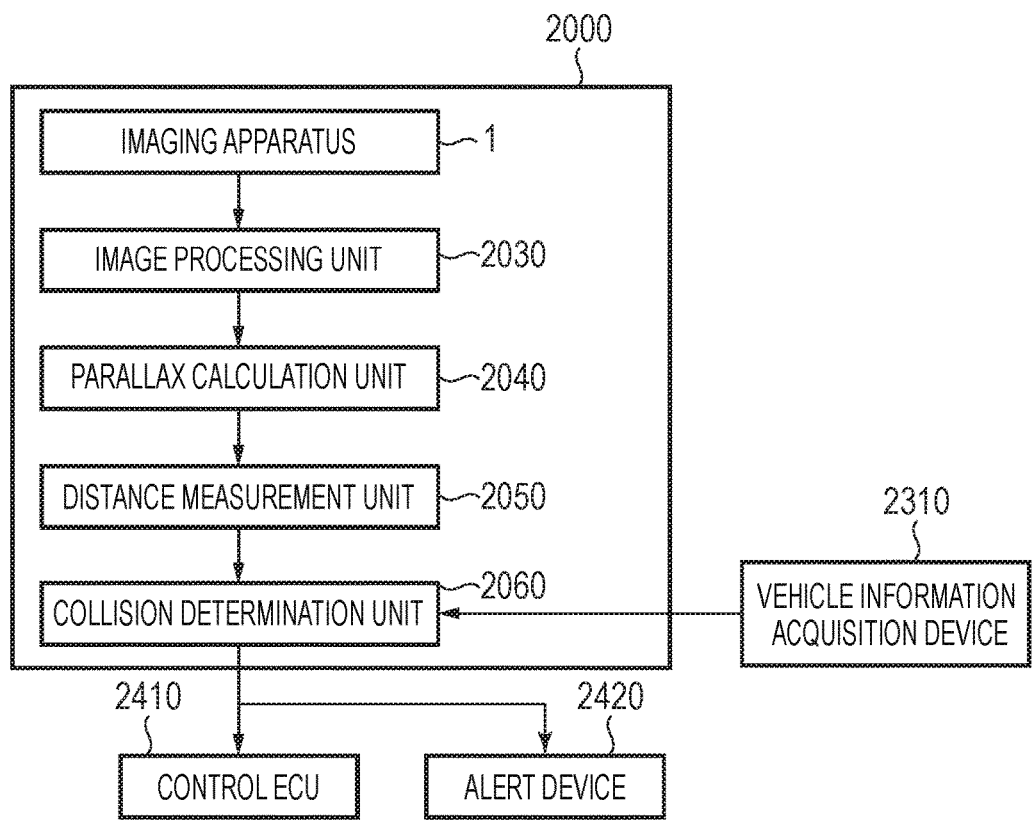
FIG. 14A and FIG. 14B are block diagrams of an imaging system in a fifth embodiment.
Figure 14B:
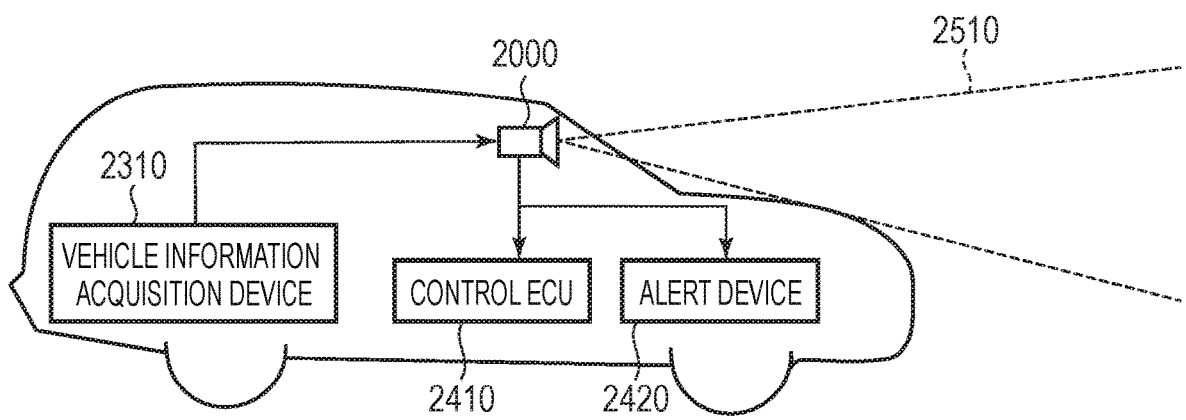

An imaging system and a moving unit according to a fifth embodiment of the present invention will be described by using FIG. 14A and FIG. 14B. FIG. 14A and FIG. 14B are diagrams illustrating a configuration example of the imaging system and the moving unit according to the present embodiment.

FIG. 14A illustrates an example of an imaging system 2000 related to an on-vehicle camera. An imaging system 2000 has an imaging apparatus 1 described in any of the above first to fourth embodiments. The imaging system 2000 has an image processing unit 2030 that performs image processing on a plurality of image data acquired by the imaging apparatus 1 and a parallax calculation unit 2040 that acquires a parallax (a phase difference of parallax images) from the plurality of image data acquired by the imaging apparatus 1. The image processing unit 2030 may have a part or all of the function of the signal processing unit 3 in the imaging apparatus 1 described in the first to fourth embodiments. Further, the imaging system 2000 has a distance measurement unit 2050 that acquires a distance to the object based on the acquired parallax and a collision determination unit 2060 that determines whether or not there is a collision possibility based on the acquired distance.

Here, the parallax calculation unit 2040 and the distance measurement unit 2050 are an example of a distance information acquisition unit that acquires distance information on the distance to the object. That is, the distance information is information on a parallax, a defocus amount, a distance to an object, or the like. The collision determination unit 2060 may use any of the distance information to determine the collision possibility. The distance information acquisition unit may be implemented by dedicatedly designed hardware or may be implemented by a software module. Further, the distance information acquisition unit may be implemented by an FPGA, an ASIC, or the like or may be implemented by a combination thereof.

The imaging system 2000 is connected to the vehicle information acquisition device 2310 and can acquire vehicle information such as a vehicle speed, a yaw rate, a steering angle, or the like. Further, the imaging system 2000 is connected to a control ECU 2410, which is a control device that outputs a control signal for causing a vehicle to generate braking force based on a determination result by the collision determination unit 2060. That is, the control ECU 2410 is one example of a moving unit control unit that controls a moving unit based on the distance information. Further, the imaging system 2000 is also connected to an alert device 2420 that issues an alert to the driver based on a determination result by the collision determination unit 2060. For example, when the collision probability is high as the determination result of the collision determination unit 2060, the control ECU 2410 performs vehicle control to avoid a collision or reduce damage by applying a brake, pushing back an accelerator, suppressing engine power, or the like. The alert device 2420 alerts a user by sounding an alert such as a sound, displaying alert information on a display of a car navigation system or the like, providing vibration to a seat belt or a steering wheel, or the like.

In the present embodiment, an area around a vehicle, for example, a front area or a rear area is captured by using the imaging system 2000. FIG. 14B illustrates the imaging system 2000 when a front area of a vehicle (a capturing area 2510) is captured. The vehicle information acquisition device 2310 transmits an instruction to the imaging system 2000 to operate and perform capturing. By using the imaging apparatus 1 of the first to fourth embodiments, the imaging system 2000 of the present embodiment can further improve the ranging accuracy.

Although the example of control for avoiding a collision to another vehicle has been described above, the embodiment is applicable to automatic driving control for following another vehicle, automatic driving control for not going out of a traffic lane, or the like. Furthermore, the imaging system is not limited to a vehicle such as the subject vehicle and can be applied to a moving unit (moving apparatus) such as a ship, an airplane, or an industrial robot, for example. In addition, the imaging system can be widely applied to a device which utilizes object recognition, such as an intelligent transportation system (ITS), without being limited to moving units.

Other Embodiments

As described above, while the imaging apparatus according to the present invention has been described, the present invention is not limited to the embodiments described above, and there is no obstacle for the embodiments to be appropriately modified and changed within the scope not departing from the spirit of the present invention. For example, it is possible to combine the configurations of the first to fourth embodiments described above. Further, instead of the RGBW pixel arrangement, color pixels in subtractive mixture of colors of cyan pixels, magenta pixels, and yellow pixels may be used. Any type of color pixel may be used as the second pixel as long as it can output a color value including any one of the color components of a plurality of colors. Further, instead of W pixels, G pixels or Ye pixels may be used. That is, any type of the first pixel may be used as long as it has higher sensitivity than the second pixel and can output a luminance value including more color components.

An imaging apparatus may not be necessarily have a solid state imaging device but may be an image processing device such as a computer that processes an image signal output from a solid state imaging device. In such a case, the imaging apparatus may be input with RAW data from a pixel signal and perform the process described above. Further, the solid state imaging device may have a signal processing unit and perform the process described above.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-216203, filed Nov. 19, 2018, which is hereby incorporated by reference herein in its entirety.

What is claimed is:

1. An imaging apparatus comprising:
a pixel unit having a plurality of first pixels and a plurality of second pixels, wherein the plurality of first pixels have higher sensitivity than the plurality of second pixels and output luminance values, and the plurality of second pixels output color values including one color component of a plurality of colors;
a first interpolation unit that generates luminance interpolation values at the plurality of second pixels based on the luminance values at the plurality of first pixels;
a calculation unit that calculates an absolute value of a difference between each of the luminance interpolation values at the plurality of second pixels generated by the first interpolation unit and the luminance value at a predetermined first pixel of the first pixels;
a select unit that selects the plurality of second pixels at each of which the absolute value of the difference is less than or equal to a predetermined value; and
a second interpolation unit that generates a color interpolation value at the predetermined first pixel based on the color values at the plurality of second pixels selected by the select unit.

2. The imaging apparatus according to claim 1,
wherein the pixel unit has a plurality of third pixels that output color values including another color component that is different from the one color component,
wherein the first interpolation unit generates luminance interpolation values at the plurality of third pixels based on the luminance values at the plurality of first pixels,
wherein when the select unit selects none of the plurality of second pixel, the select unit selects the plurality of third pixels at each of which an absolute value of a difference between each of the luminance interpolation values at the plurality of third pixels generated by the first interpolation unit and the luminance value at the predetermined first pixel is less than or equal to a predetermined value, and
wherein the second interpolation unit generates the color interpolation value at the predetermined first pixel based on the color values at the plurality of third pixels selected by the select unit.

3. The imaging apparatus according to claim 2 further comprising a pixel counting unit that counts the number of the plurality of second pixels selected by the select unit and the number of the plurality of third pixels selected by the select unit.

4. The imaging apparatus according to claim 2, wherein when none of the plurality of second pixels is selected by the select unit, address information identifying the predetermined first pixel is output.

5. The imaging apparatus according to claim 4, wherein the address information further includes a count value indicating the number of the plurality of second pixels selected by the select unit and the number of the plurality of third pixels selected by the select unit.

6. The imaging apparatus according to claim 1, wherein the second interpolation unit generates a luminance interpolation value at the predetermined first pixel from the luminance interpolation values at the plurality of second pixels selected by the select unit.

7. The imaging apparatus according to claim 5 further comprising a color composite unit that generates the color values, the color interpolation value, the luminance values, and the luminance interpolation values and produces a color image.

8. The imaging apparatus according to claim 1, wherein the first interpolation unit determines an average value of the luminance values of the plurality of first pixels as the luminance values of the plurality of second pixels.

9. The imaging apparatus according to claim 1, wherein the first interpolation unit calculates an average value of the luminance values of the plurality of first pixels by using weighting coefficients in accordance with distances from the plurality of first pixels to any one of the second pixels and determines the average value as the luminance values of the one of the second pixels.

10. The imaging apparatus according to claim 1, wherein the plurality of first pixels have a spectral sensitivity characteristic having a wider half-value width than the plurality of second pixels.

11. The imaging apparatus according to claim 1, wherein each of the plurality of first pixels is a white pixel.

12. The imaging apparatus according to claim 1, wherein each of the plurality of second pixels is any of a red pixel, a green pixel, and a blue pixel.

13. The imaging apparatus according to claim 1, wherein the number of the plurality of first pixels is three or more times the number of the plurality of second pixels.

14. The imaging apparatus according to claim 1, wherein each of the plurality of second pixels is surrounded by the plurality of first pixels.

15. An image processing device that processes a signal from a solid state imaging device comprising a pixel unit having a plurality of first pixels and a plurality of second pixels, wherein the plurality of first pixels have higher sensitivity than the plurality of second pixels and output luminance values, and the plurality of second pixels output color values including one color component of a plurality of colors, the image processing device comprising:
a first interpolation unit that generates luminance interpolation values at the plurality of second pixels based on the luminance values at the plurality of first pixels;
a calculation unit that calculates an absolute value of a difference between each of the luminance interpolation values at the plurality of second pixels generated by the first interpolation unit and the luminance value at a predetermined first pixel of the first pixels;
a select unit that selects the plurality of second pixels at each of which the absolute value of the difference is less than or equal to a predetermined value; and
a second interpolation unit that generates a color interpolation value at the predetermined first pixel based on the color values at the plurality of second pixels selected by the select unit.

16. An image processing method for a pixel unit comprising a plurality of first pixels and a plurality of second pixels, the plurality of first pixels having higher sensitivity than the plurality of second pixels and outputting luminance values including a luminance component, and the plurality of second pixels outputting color values including one color component of a plurality of colors the method comprising:
generating luminance interpolation values at the plurality of second pixels based on the luminance values at the plurality of first pixels;
calculating an absolute value of a difference between each of the luminance interpolation values at the plurality of second pixels and the luminance value at a redetermined first pixel of the first pixels;

selecting the plurality of second pixels at each of which the absolute value of the difference is less than or equal to a predetermined value; and generating a color interpolation value at the predetermined first pixel based on the color values at the selected plurality of second pixels.

17. A moving unit comprising:

the imaging apparatus according to claim 1;

a distance information acquisition unit that acquires distance information on a distance to an object, from a parallax image based on signals output from the pixel unit of the imaging apparatus; and a control unit that controls the moving unit based on the distance information.

* * * * *